US005732473A

United States Patent [19]

Gagnon

[11] Patent Number: 5,732,473

[45] Date of Patent: Mar. 31, 1998

[54] HOLOGRAPHIC SUNDIAL

[76] Inventor: David R. Gagnon, 1143 Annabelle La., Grants Pass, Oreg. 97527

[21] Appl. No.: 589,873

[22] Filed: Jan. 23, 1996

[51] Int. Cl.[6] .................... G01C 17/34

[52] U.S. Cl. .................... 33/270

[58] Field of Search .................... 33/268, 269, 270, 33/271

[56] References Cited

U.S. PATENT DOCUMENTS

| | | | |
|---|---|---|---|
| 4,237,611 | 12/1980 | Wurch et al. | 33/271 |
| 4,782,472 | 11/1988 | Hines | 33/270 |
| 5,056,232 | 10/1991 | Cunningham | 33/270 |
| 5,590,093 | 12/1996 | Scharstein et al. | 33/271 |
| 5,596,553 | 1/1997 | Kellogg | 33/270 |

FOREIGN PATENT DOCUMENTS

| | | | |
|---|---|---|---|
| 202800 | 9/1991 | Japan | 33/270 |
| 94/03844 | 2/1994 | WIPO | 33/270 |

OTHER PUBLICATIONS

A. Gongora-T and Robin G. Stuart, Holographic Sundial, Applied Optics, vol. 29, No. 32, pp. 4751–4752, Nov. 1990.

*Primary Examiner*—Thomas B. Will

[57] ABSTRACT

A holographic sundial comprising a hologram made using a holographic recording apparatus including a light-sensitive recording medium, a three-dimensional model, in one or more parts, bearing a plurality of indicia over a range of angles corresponding to hour angles of the sun, illumination of the three-dimensional model such that light is incident on the light-sensitive recording medium from every angle of the three-dimensional model in a manner conformal to the represented hour angle, and a reference ray of light incident on the recording medium from one angular direction which defines the angular direction for viewing the recorded image. The hologram, under direct illumination by light from the sun, produces a continuously varying image which indicates the time of day.

16 Claims, 4 Drawing Sheets

HOLOGRAPHIC SUNDIAL

BACKGROUND—FIELD OF INVENTION

The invention relates to sundials, specifically to a holographic recording which, when viewed in direct sunlight, produces an image indicating the time of day, in the manner of a sundial.

BACKGROUND—DESCRIPTION OF PRIOR ART

The use of sundials to tell the time of day dates back more than twenty centuries. In the first century BC, Vitruvius described many types of sundials then in use. In fact, he complained that he could not invent a new sundial because the field was already exhausted. Of course, this turned out not to be true. The modern type of sundial with a slanted object for casting the shadow appeared much later and was the principal method of timekeeping for nearly thirteen centuries.

In general, every new type of sundial consists of some new arrangement of elements or features which are common to every type of sundial. A truly novel sundial, utilizing a new technology, appears rarely. The Japanese patent document JA0202800 (Appl. No. 1-290818, 1991) of Hideaki Amano describes the application of holography to the ancient art of the sundial. This invention is a hologram which displays the time of day according to the angle of the incident sunlight to function as a sundial. Essentially the same type of holographic sundial is described by Gongora -T. and Stuart (*Applied Optics*, p. 4751, vol. 29, no. 32, November 1990). Both of these applications require a multiplicity of recordings, one recording for each time of day image to be displayed. Each recording uses a different model for the readout to be displayed and a unique incidence angle for the laser light used to make the recording. For a practical time-keeping device, a considerable number of recordings is required. This approach cannot give a continuously varying display of the time of day but only a limited number of discreet displays. It is also well known that the brightness of each image displayed by a multiple-image hologram is diminished as the number of recorded images is increased. It follows that this type of holographic sundial suffers from an inherent compromise between the precision of its time reading and the visibility of its display.

OBJECTS AND ADVANTAGES

Several objects and advantages of my holographic sundial are as follows:

(a) to provide a holographic sundial which is made by a single-exposure recording process;

(b) to provide a holographic sundial which is recorded using only one recording model;

(c) to provide a holographic sundial which produces a continuously varying time-of-day display;

(d) to provide a holographic sundial with greatly increased brightness over previously described approaches;

(e) to provide a holographic sundial which can automatically correct for seasonal variation of solar time according to the declination of the sun and thereby give direct reading of local standard time; and (f) to provide a holographic sundial which can be easily mass-produced using techniques which are applied to the mass-production of holograms.

Further objects and advantages of the holographic sundial will become apparent from a consideration of the drawings and ensuing description.

DRAWING FIGURES

In the drawings, closely related figures have the same number but different alphabetic suffixes.

DESCRIPTION—FIGS. 1 TO 2

Figure 1A:
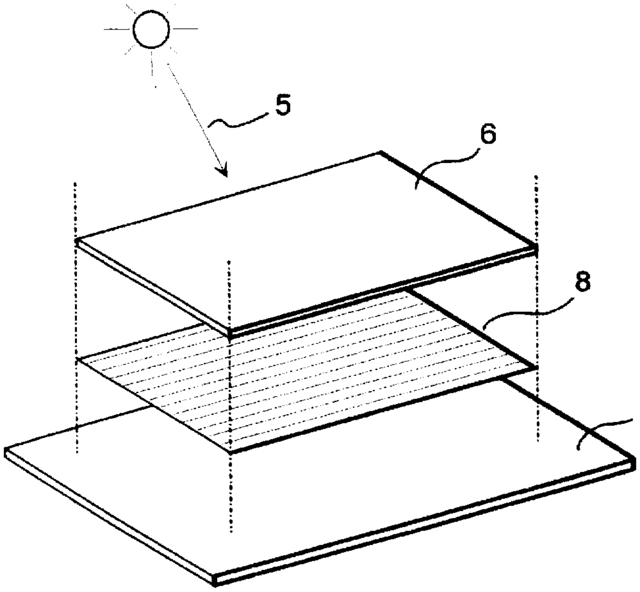
FIGS. 1A to 1C depict a few of the numerous and varied forms which may be used in the design of the holographic sundial.

FIG. 1A shows a flat, planar design, the simplest of many possible forms which the holographic sundial can take. The heart of the holographic sundial is a holographic recording 8, which may be made in silver-halide film, photo-chromic plastic, or embossed metal foil, among a number of possible choices of recording media. A transparent weather cover 6 may be included for protection from the elements. The entire assembly includes some sort of mounting structure or plate 10 to which holographic recording 8 and transparent weather cover 6 are cemented or otherwise attached for the purpose of mounting the holographic sundial in a permanent installation.

Figure 1B:
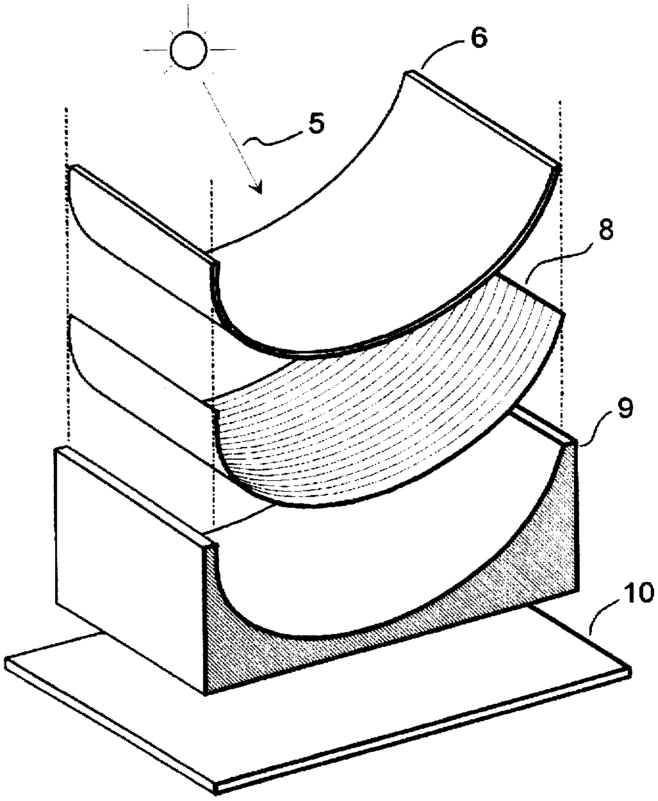

Holographic recording 8 may also be curved, as shown in FIG. 1B, for aesthetic purposes and to improve the resolution of the image produced at wide angles corresponding to early morning and late afternoon hours. The FIG. shows a conformal support 9 for attachment to mounting plate 10 or some other flat surface. While FIG. 1B shows the form of a concave cylindrical section, other forms are certainly possible, including a convex cylindrical section or hemisphere.

Figure 1C:
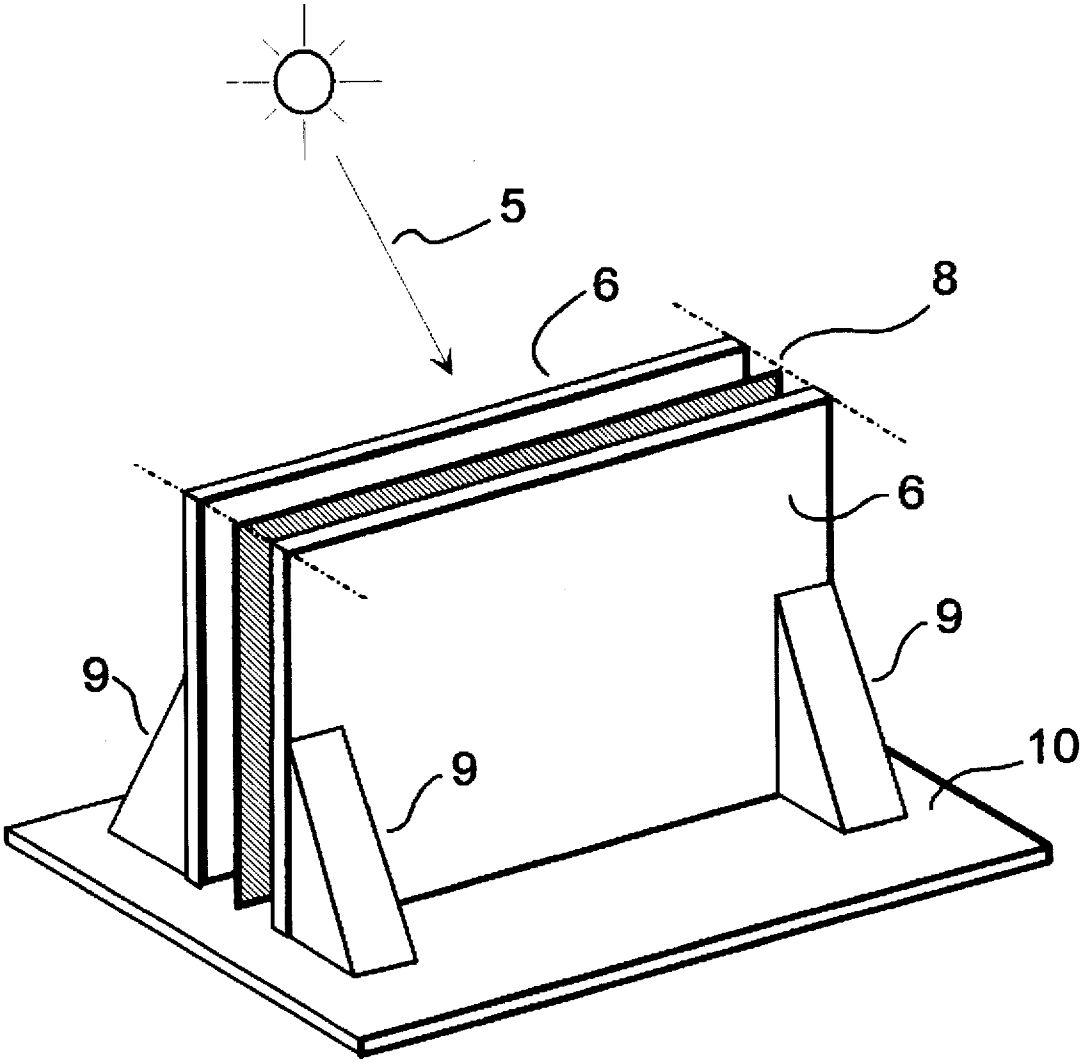

Both FIG. 1A and FIG. 1B represent designs for the holographic sundial operating as a reflection hologram. The holographic sundial can also be realized as a transmission hologram, one possible design for which is shown in FIG. 1C. For this type of design, the image is formed by sunlight transmitted through, rather than reflected from, holographic recording 8.

Figure 2A:
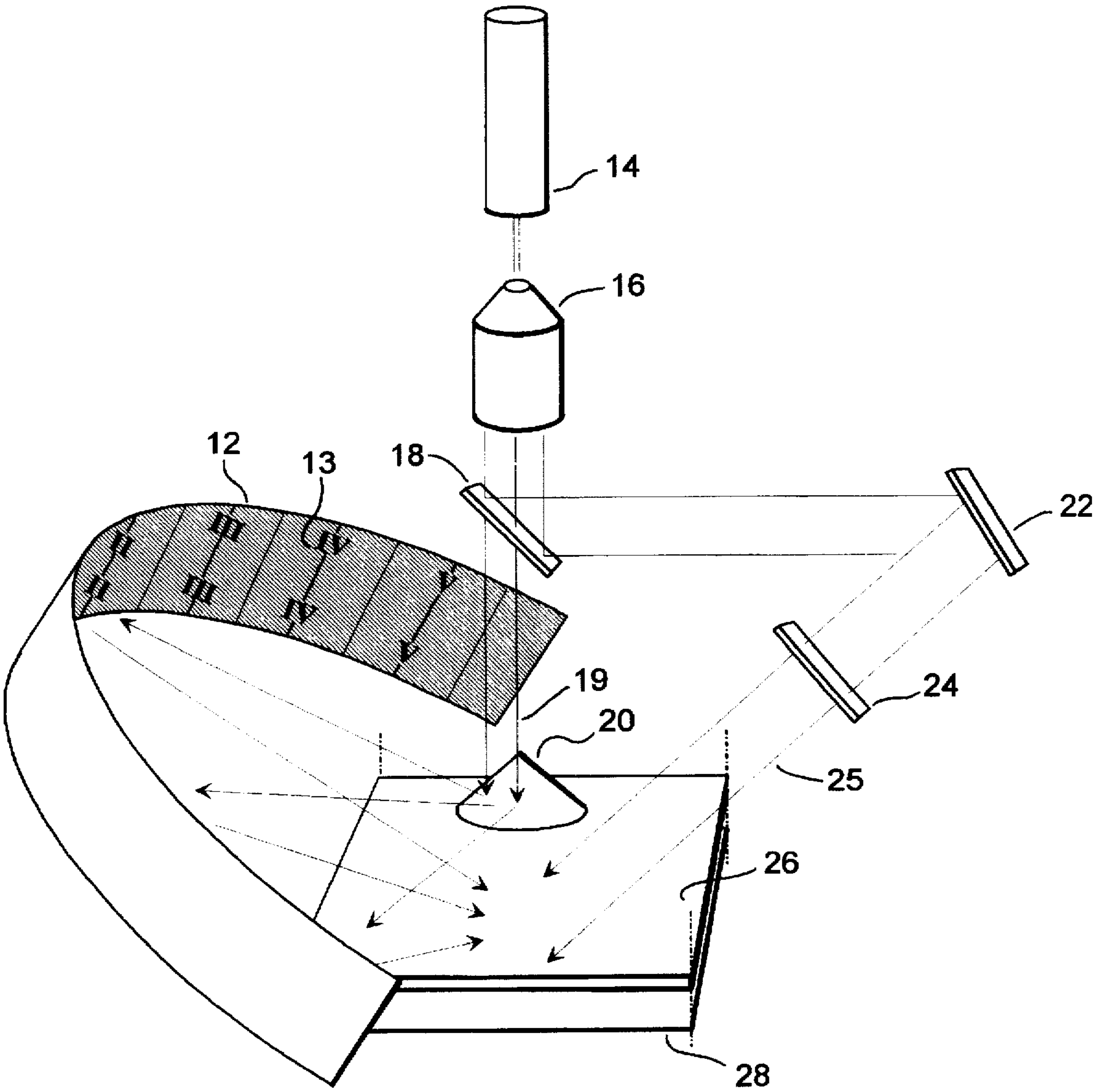
FIGS. 2A to 2B show basic arrangements which are used for recording the master hologram, and show some of the basic features which may be included in the design of the holographic sundial.

A basic setup for producing holographic recording 8 is shown in FIG. 2A. Lines with arrowheads in the figure indicate the path of light in the setup. A three-dimensional recording model 12 bears a set of time marks 13 which are to be recorded. Light from a laser 14 is expanded by a beam expander 16. A beam splitter 18 divides the light from beam expander 16 into two parts, an object beam 19 and a reference beam 25. Object beam 19 is incident on an object beam reflector 20 which illuminates three-dimensional recording model 12. Light reflected from three-dimensional recording model 12 arrives at a recording medium 28. A transparent recording cover 26 would be used over recording medium 28 if transparent weather cover 6 is to be incorporated in the design of the holographic sundial. Light reflected from beam splitter 18 is sent to a mirror 22 which reflects the light to a beam attenuator 24 from whence it is transmitted to recording medium 28. There are various possible arrangements for recording the holographic image and these may include additional features such as a gnomon 30 or shadow casting object, shown in FIG. 2B.

Operation FIGS. 1 to 2

FIG. 1A shows the simplest form of the holographic sundial wherein holographic recording 8 comprises a reflection hologram. In operation, the holographic sundial is placed so that is illuminated by direct sunlight, i.e., in a direct line of sight from the sun 5. Illumination may be through a window for indoor installation. Light from the sun is transmitted through transparent weather cover 6 where it is then incident on holographic recording 8 which is oriented to the path of the sun in the same relation as recording medium 28 to three-dimensional recording model 12 (FIG. 2A). Light is reflected from holographic recording 8 and transmitted back through transparent weather cover 6 to form an image of time marks 13 indicating the time of day to a person viewing the image along a line of sight established by the incidence of reference beam 25 on recording medium 28 (FIG. 2A). Transparent weather cover 6 and holographic recording 8 are cemented or otherwise attached to mounting plate 10 or some structure which provides rigid mounting of the assembly. Indoor installation, such as on a windowsill, would not require weather cover 6 or mounting plate 10.

A method for producing holographic recording 8 is depicted in FIG. 2A. Three-dimensional recording model 12 is a form or pattern which bears a series of time marks 13 at angles equal to the corresponding hour angles of the sun. It is positioned at a median angle from the horizontal plane of recording medium 28 equal to the complement of the geographic latitude at which the holographic sundial is to be used. Three-dimensional recording model 12 occupies an angular range of about 180 degrees in azimuth and at least 46 degrees in elevation, corresponding to the range of angles in which the sun appears over an entire year. A narrow beam of coherent light from laser 14 is enlarged by beam expander 16. Beam splitter 18 transmits a portion of the light, object beam 19, which is incident on object beam reflector 20. Object beam reflector 20 is designed to uniformly illuminate three-dimensional recording model 12 from which part of the light is reflected onto recording medium 28 through transparent recording cover 26. Transparent recording cover 26 matches the thickness and index of refraction of transparent weather cover 6 in FIGS. 1A to 1C to compensate the optical effects of weather cover 6. That portion of light reflected from beam splitter 18 is reflected by mirror 22 through beam attenuator 24, through transparent recording cover 26, and onto recording medium 28. The purpose of beam attenuator 24 is to match the intensity of light in reference beam 25 to that of the light which arrives at recording medium 28 from three-dimensional recording model 12. The line of sight of reference beam 25 to recording medium 28 determines the line of sight on which the holographic image is viewed to read the time of day. The angle at which reference beam 25 is incident on recording medium 28 is therefore chosen so as to prevent coincidence of the image with the specular reflection of sunlight from holographic recording 8 and transparent weather cover 6.

The type of setup shown in FIG. 2A will produce a transmission hologram which would be used as holographic recording 8 in a transmission-type version of the holographic sundial, such as depicted in FIG. 1C. The transmission hologram could also be used as a holographic master recording from which additional recordings, of the reflection type, can be reproduced using techniques which are well-known in the field of holography. The arrangement depicted in FIG. 2A is by no means the only one possible for producing holographic recording 8 and is meant to illustrate the principles of manufacturing and operating the holographic sundial. In fact, holographic recording 8 could be computer-generated, without the need of an optical setup such as the one shown in the figure. For this purpose, an algorithmic model of the setup of FIG. 2A would be used to compute interference between reference beam 25 and light scattered from three-dimensional recording model 12 in the plane of holographic recording 8. Once the resulting interference pattern is transferred onto a film, it will function in the same manner as holographic recording 8.

Figure 2B:
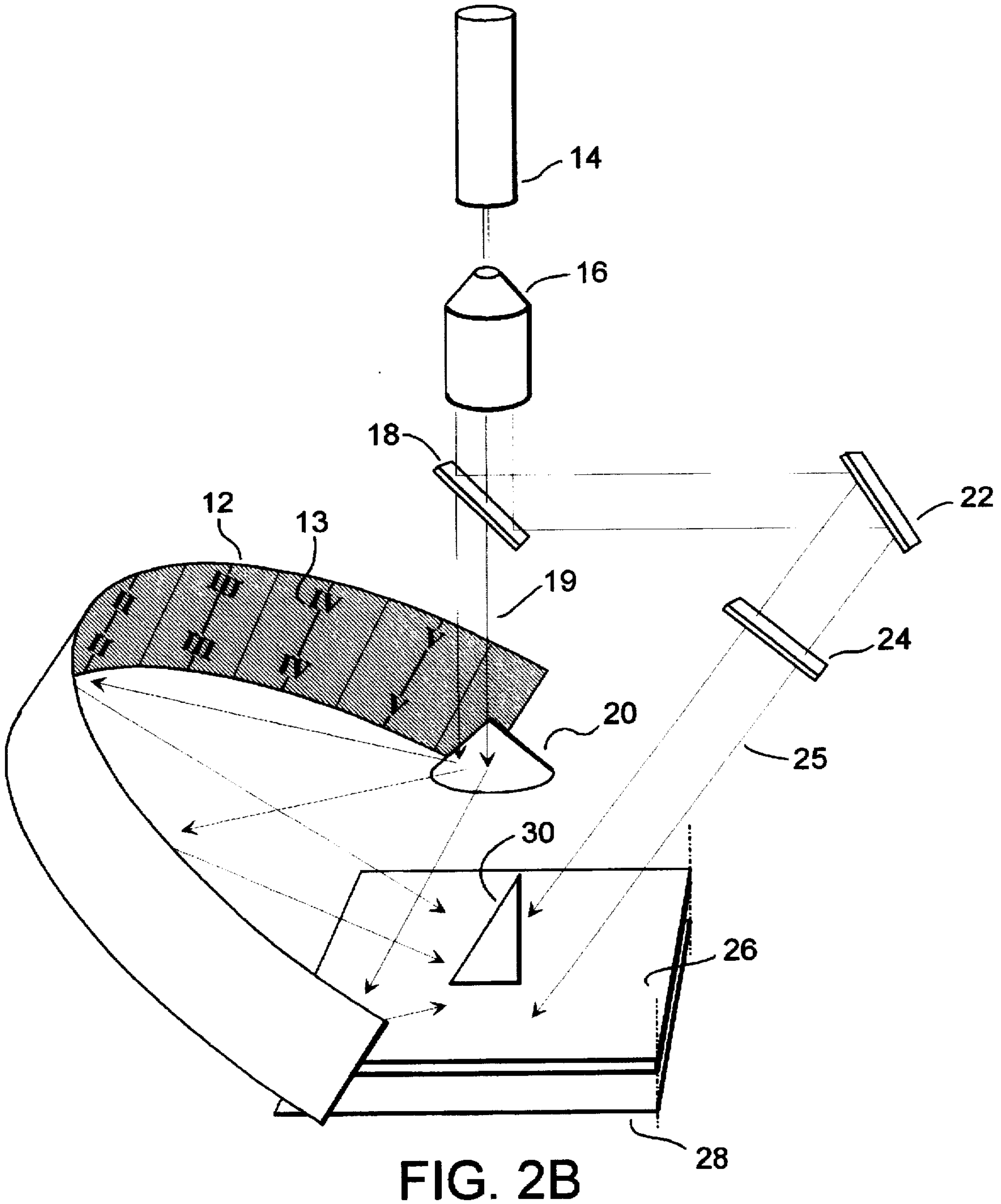

Additional features may be incorporated in the design of the holographic sundial as shown in FIG. 2B which includes a gnomon 30. A recording made with gnomon 30 will produce a shadowed image which more nearly resembles the operation of a conventional sundial without a gnomon or shadow casting object being a material part of the holographic sundial.

Over the course of a year, the declination of the sun varies or, in other words, the path of the sun varies in its elevation as solar time varies to lag or lead standard time according to the equation of time. The holographic sundial can be made to directly indicate standard time by incorporating corrections to each time mark 13 on three-dimensional recording model 12 along elevation angles corresponding to the elevation of the sun's path versus time of year. The correction to standard time is automatic and unnoticeable since only corrected time marks appear in the displayed image. It should be noted that a single recording can correct to standard time for one half of the year because solar time will first lag, then lead Standard Time at a particular declination of the sun.

Multiple images can be recorded on a single holographic recording by making additional exposures on recording medium 28 using separate recording setups or by recording them on separate masters. These additional images can be coincident with the displayed time of day or can be recorded for display at other viewing angles by changing the angles of incidence of object beam 19 or reference beam 25 in each recording setup. Each additional image can thereby be made viewable depending on the user's line of sight or the position of the sun or both. Multiple images can be used to provide customizing features or additional functions to the holographic sundial. It should be noted that, with each additional image recorded in holographic recording 8, the brightness of every recorded image is reduced.

As an example of the utility of multiple recordings, a recording could be added to provide a calendar function by exploiting the seasonally varying declination of the sun. For this purpose, a recording model, bearing arcs and indicia at various elevation angles to indicate the corresponding time of year, would be used in a setup like the one shown in FIG. 2A. It should be noted that a single recording can indicate the time of year for one half of the year because the sun passes twice through a particular declination angle over the course of an entire year.

Theory of Operation

The operation of the holographic sundial, specifically of a holographic recording operating as a sundial, relies on the principle of reciprocity, a fundamental theorem of electromagnetic theory which is treated in most advanced textbooks on the subject. The theorem can be greatly simplified to the following statement: In a linear, isotropic region of space, the radiation pattern arriving at a receiver from a radiating source is identical to the radiation pattern for which the source becomes the receiver and the receiver becomes the source.

In normal operation, the image produced by a holographic recording is viewed by illuminating the hologram with a light source equivalent to the reference beam which is used in making the recording. The image is then viewed along lines of sight corresponding to the lines of sight from the recorded object to the recording medium. Refer to FIG. 2A: For the holographic sundial, the image is viewed along the fixed line of sight defined by reference beam 25 with illumination from the sun along the various lines of sight from each time mark 13 on three-dimensional recording model 12, to recording medium 28. By reciprocity, the same image of the time display for a particular hour angle of the sun can be viewed along the line of sight of reference beam 25 as for viewing along the given hour angle with illumination from the direction defined by original reference beam 25.

SUMMARY, RAMIFICATIONS, AND SCOPE

Thus the reader will see that the holographic sundial of the present invention represents a truly novel type of sundial by its realization as a hologram and by its stated advantages over the prior art. The hologram sundial of the present invention is made by a single recording of a three-dimensional recording model incorporating nearly the full range of daylight time to be displayed. It will give a continuously varying display of the time as an actual sundial would and the brightness of its display is not limited by the requirement of multiple recorded images.

Furthermore, the holographic sundial has the additional advantages that:

- it eliminates the requirement of a projecting shadow casting object or gnomon as a material part of a sundial;
- it can incorporate various features or changes in its design by adding just those features or changes in a given recording setup;
- it can provide other utility in addition to its timekeeping function by incorporating multiple images into a single holographic recording such that the additional images appear coincident with the time display or at other positions of the viewer or of the sun;
- it can display a calendar function based on the varying declination of the sun in a yearly cycle;
- it can incorporate seasonal and zonal corrections to provide a sundial which is automatically corrected for seasonal variations to give direct reading of local standard time;
- it can be easily reproduced as a holographic recording using steps which are akin to reproduction of photographs; it can be easily mass-produced from a holographic master recording by techniques which are widely used in the mass-production of holograms.

While my above description contains many specificities, these should not be construed as limitations on the scope of the invention, but rather as an exemplification of some of the presently preferred embodiments thereof. For example, other possible features may be included holographically, such as indicia which display correct alignment for setting up the holographic sundial, etc. In addition, the holographic sundial can take many other forms such as spherical or hemispherical. Accordingly, the scope of the invention should be determined not by the embodiments illustrated, but by the appended claims and their legal equivalents.

I claim:

1. A holographic sundial comprising a hologram made using a holographic recording apparatus which includes the following elements:

(a) a light-sensitive recording medium, (b) a three-dimensional recording model, in one or more parts, bearing a plurality of time marks over a range of angles corresponding to hour angles of the sun, (c) means for illuminating said three-dimensional recording model such that light is incident on said light-sensitive recording medium from every angle of said three-dimensional recording model in a manner conformal to the represented hour angle, (d) a reference beam of light incident on the recording medium from one angular direction which defines the angular direction for viewing the recorded image, whereby said hologram, under direct illumination by light from the sun, provides holographic means for producing an image which indicates the time of day.

2. The holographic sundial of claim 1 wherein is included a mounting structure.

3. The holographic sundial of claim 1 wherein is included a transparent weather cover.

4. The holographic sundial of claim 1 wherein seasonal differences between local solar time and standard time are incorporated in said three-dimensional recording model at various angles corresponding to the seasonally varying declination angle of the sun.

5. The holographic sundial of claim 1 wherein additional images are recorded.

6. The holographic sundial of claim 1 wherein is recorded the image of a gnomon or shadow casting object providing obscuring means to indicate a time mark.

7. The holographic sundial of claim 1 wherein are recorded images of indicia providing means for indicating the time of year.

8. The holographic sundial of claim 1 wherein an algorithmic model of said holographic recording apparatus is used to compute the combination of said reference ray of light with light scattered from said three-dimensional recording model or its equivalent at the position of said light-sensitive recording medium whereby said hologram is produced without the physical embodiment of said holographic recording apparatus.

9. A holographic sundial comprising a hologram made by reproducing means from a holographic master recording, said holographic master recording made using a holographic recording apparatus which includes the following elements:

(a) a light-sensitive recording medium, (b) a three-dimensional recording model, in one or more parts, bearing a plurality of time marks over a range of angles corresponding to hour angles of the sun, (c) means for illuminating said three-dimensional recording model such that light is incident on said light-sensitive recording medium from every angle of said three-dimensional recording model in a manner conformal to the represented hour angle, (d) a reference beam of light incident on the recording medium from one angular direction which defines the angular direction for viewing the recorded image, whereby said hologram, under direct illumination by light from the sun, provides holographic means for producing an image which indicates the time of day.

10. The holographic sundial of claim 9 wherein is included a mounting structure.

11. The holographic sundial of claim 9 wherein is included a transparent weather cover.

12. The holographic sundial of claim 9 wherein seasonal differences between local solar time and standard time are incorporated in said three-dimensional recording model at various angles corresponding to the seasonally varying declination angle of the sun.

13. The holographic sundial of claim 9 wherein additional images are recorded.

14. The holographic sundial of claim 9 wherein is recorded the image of a gnomon or shadow casting object providing obscuring means to indicate a time mark.

15. The holographic sundial of claim 9 wherein are recorded images of indicia providing means for indicating the time of year.

16. The holographic sundial of claim 9 wherein an algorithmic model of said holographic recording apparatus is used to compute the combination of said reference ray of light with light scattered from said three-dimensional recording model or its equivalent at the position of said light-sensitive recording medium whereby said holographic master recording is produced without the physical embodiment of said holographic recording apparatus.

* * * * *